US012692447B2

(12) United States Patent
Gazarian et al.

(10) Patent No.: US 12,692,447 B2
(45) Date of Patent: Jul. 28, 2026

(54) UNIT FOR PRODUCING AND SEPARATING AROMATICS WITH RECOVERY OF AN EXTRACT AND/OR RAFFINATE FROM A LIQUID-LIQUID EXTRACTION PROCESS

(71) Applicant: IFP ENERGIES NOUVELLES, Rueil-Malmaison (FR)

(72) Inventors: Jeremy Gazarian, Rueil-Malmaison Cedex (FR); Thi Bich Ngoc Dang, Rueil-Malmaison Cedex (FR); Li Zhang, Rueil-Malmaison Cedex (FR); Arnaud Cotte, Rueil-Malmaison (FR); Anaïs Dorsey, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 230 days.

(21) Appl. No.: 18/722,049

(22) PCT Filed: Dec. 13, 2022

(86) PCT No.: PCT/EP2022/085676
§ 371 (c)(1),
(2) Date: Jun. 20, 2024

(87) PCT Pub. No.: WO2023/117594
PCT Pub. Date: Jun. 29, 2023

(65) Prior Publication Data
US 2024/0417631 A1      Dec. 19, 2024

(30) Foreign Application Priority Data

Dec. 21, 2021      (FR) ........................................ 2114150

(51) Int. Cl.
*C10G 35/09*          (2006.01)
*B01D 3/14*           (2006.01)
(Continued)

(52) U.S. Cl.
CPC ............. *C10G 35/09* (2013.01); *B01D 3/143* (2013.01); *B01J 8/0492* (2013.01); *C10G 61/04* (2013.01); *C10G 63/02* (2013.01)

(58) Field of Classification Search
CPC ........ C10G 35/09; C10G 61/04; C10G 63/02; B01D 3/143; B01J 8/0492
See application file for complete search history.

(56) References Cited

U.S. PATENT DOCUMENTS 4,962,258 A      10/1990  Amelse et al.
6,180,550 B1     1/2001   Beck et al.
(Continued)

FOREIGN PATENT DOCUMENTS

FR       3104572 A1     6/2021
JP       2013536226 A  *  9/2013   ............... C10G 7/00

OTHER PUBLICATIONS

International Search report PCT/EP2022/085676 dated Feb. 3, 2023 (pp. 1-2).

*Primary Examiner* — Kyle Armstrong
(74) *Attorney, Agent, or Firm* — Millen, White, Zelano & Branigan, P.C.; Brion P. Heaney

(57) ABSTRACT

The invention relates to a production and separation device and method wherein: a reforming effluent (40) is produced and fractionated in a separation unit (1) and a fractionation train (5-6-7) for extracting benzene (22), toluene (23), xylenes (24) and C9-10 aromatics; aromatics are extracted from a feedstock (41) in a liquid-liquid extraction unit (14) to produce a first raffinate (43) and a first extract (42), the first extract (42) being sent to a benzene-toluene fractionation device (5); the xylenes are separated in a xylene separation unit (10) to produce a second extract (31) containing para-xylene, and a second raffinate (32) containing ortho-xylene and meta-xylene; and the second raffinate is
(Continued)

isomerised in an isomerisation unit (11) so as to produce an isomerate (34) enriched in para-xylene sent to a fractionation train (5-6-7).

19 Claims, 3 Drawing Sheets

(51) Int. Cl.
  B01J 8/04          (2006.01)
  C10G 61/04          (2006.01)
  C10G 63/02          (2006.01)

(56)                    References Cited

U.S. PATENT DOCUMENTS

| | | | |
|---|---|---|---|
| 7,288,687 B1 * | 10/2007 | Frey | C07C 5/2732 |
| | | | 585/319 |
| 7,371,913 B2 | 5/2008 | Bauer | |
| 7,915,471 B2 | 3/2011 | Leflaive et al. | |
| 8,697,929 B2 | 4/2014 | Ou et al. | |
| 10,029,958 B2 | 7/2018 | Dreux et al. | |
| 10,035,739 B2 | 7/2018 | Dreux et al. | |
| 2009/0047190 A1 * | 2/2009 | Zhou | B01D 3/143 |
| | | | 422/609 |
| 2015/0166435 A1 | 6/2015 | Serban et al. | |

* cited by examiner

UNIT FOR PRODUCING AND SEPARATING AROMATICS WITH RECOVERY OF AN EXTRACT AND/OR RAFFINATE FROM A LIQUID-LIQUID EXTRACTION PROCESS

TECHNICAL FIELD

The invention relates to the production of aromatics for the petrochemical industry (benzene, toluene and xylenes, i.e. BTX). More particularly, the object of the invention is to be able to increase the production of aromatics produced by injecting a stream originating from a liquid-liquid extraction process which can itself be fed with catalytic cracking gasolines, pyrolysis gasolines and/or reformate.

An aromatic complex (or device for producing and separating aromatic compounds) is a device fed with feedstocks predominantly composed of six to ten carbon atoms or more, referred to as C6 to C10$_+$ feedstocks. Various sources of aromatic compounds can be introduced into an aromatic complex, the most common sources being reformate, effluent from the catalytic reforming of naphthas, and pyrolysis gasoline, resulting from steam cracking.

Mixtures of aromatic compounds obtained by a process for producing and separating lignocellulosic biomass can also, after a purification treatment, be introduced into an aromatic complex. The process for chemical looping combustion of lignocellulosic biomass can, for example, be considered as a source of aromatics.

Within an aromatic complex, irrespective of the source of aromatics, benzene and alkylaromatics containing 7 to 10 carbon atoms are extracted therefrom and are then converted and/or purified to give desired intermediates. The products of interest are aromatics with 0 (benzene), 1 (toluene) or 2 (xylenes) methyl groups, and in particular, among the xylenes, para-xylene, having the greatest market value.

PRIOR ART

To date, aromatic complexes make it possible to produce benzene, optionally toluene, and xylenes (often para-xylene, sometimes ortho-xylene or meta-xylene or also a mixture of xylenes). An aromatic complex generally has a para-xylene purification unit and at least one catalytic unit having at least one of the following functions:

the isomerization of aromatic compounds containing 8 carbon atoms, denoted A8 compounds, making it possible to convert ortho-xylene and meta-xylene into para-xylene. Ethylbenzene is converted either to para-xylene or to benzene depending on the type of isomerization;

transalkylation, making it possible to produce xylenes from a mixture of toluene (and optionally of benzene) and of A9$_+$ compounds, such as trimethylbenzenes and tetramethylbenzenes;

the disproportionation of toluene, which makes it possible to produce benzene and xylenes.

The aromatic loop makes it possible to produce high-purity para-xylene by separation by adsorption or by crystallization, an operation which is well known from the prior art. This "C8 aromatic loop" includes a step of removing the heavy compounds (i.e., C9$_+$ compounds) in a distillation column known as a "xylenes column". The top stream from this column, which contains the C8 aromatic isomers (i.e. A8 isomers), is subsequently sent to the process for separation of the para-xylene which is, very generally, a process for separation by simulated moving bed (SMB) adsorption, to produce an extract and a raffinate, or a crystallization process, in which a para-xylene fraction is isolated from the remainder of the constituents of the mixture in the form of crystals.

The extract, which contains the para-xylene, is subsequently distilled in order to obtain high-purity para-xylene. The raffinate, which is rich in meta-xylene, ortho-xylene and ethylbenzene, is treated in a catalytic isomerization unit which restores a mixture of C8 aromatics in which the proportion of the xylenes (ortho-, meta-, para-xylenes) is virtually at thermodynamic equilibrium and the amount of ethylbenzene is reduced. This mixture is again sent to the "xylenes column".

All the industrial processes for isomerization of C8 aromatics make it possible to isomerize xylenes. The conversion of ethylbenzene depends, on the other hand, on the type of process and of catalyst which are chosen. This is because petrochemical complexes utilize an "isomerizing" isomerization unit (i.e. isomerization of ethylbenzene to give a mixture of C8 aromatics) or a "dealkylating" isomerization unit (i.e., dealkylation of ethylbenzene to give benzene), in order to favor the production (at the outlet of the aromatic loop) respectively either of para-xylene alone or of benzene and para-xylene.

The choice of an "isomerizing" isomerization makes it possible, as indicated above, to maximize the production of para-xylene, which is the compound having the highest added value at the outlet of the aromatic complex. The combination within an aromatic complex of an "isomerizing" isomerization and of a liquid-phase isomerization, such as described, for example, in the patents U.S. Pat. Nos. 8,697,929, 7,371,913, 4,962,258, 6,180,550, 7,915,471, 10,035,739 and 10,029,958, makes it possible in particular to maximize the amount of para-xylene produced while having a reduced loss of aromatic rings, in comparison with an aromatic complex according to the prior art.

SUMMARY OF THE INVENTION

In the context described above, a first object of the present description is to upgrade streams originating from a process for liquid-liquid extraction of aromatic compounds in order to increase the production of aromatics (para-xylene and benzene).

Specifically, the present invention relates to a device and a process for the production of aromatics incorporating a liquid-liquid extraction unit for the separation of aromatics, which provides two streams:

a stream containing aromatics, referred to as the first extract, comprising (essentially) aromatics having six to eleven or more carbon atoms, denoted A6-A11, preferably comprising (essentially) aromatics containing six to ten carbon atoms, denoted A6-A10, is sent to a benzene-toluene fractionation device; and a stream containing non-aromatics, referred to as the first raffinate, this stream can be sent to the inlet of a catalytic reforming unit or be sent to a steam cracking unit or be exported to a gasoline pool.

According to a first aspect, the aforementioned objects, and also other advantages, are obtained by a device for producing and separating aromatic compounds, comprising:

a catalytic reforming unit suitable for: treating a first feedstock comprising naphthas in the presence of a reforming catalyst; and producing at least one reforming effluent comprising hydrocarbon compounds having 6 to 10 carbon atoms, a feedstock separation unit suitable for: separating the reforming effluent into at least one hydrocarbon cut comprising compounds containing 6 or 7 carbon atoms and an aromatic cut containing 8 or more carbon atoms, a liquid-liquid extraction unit suitable for: extracting aromatics from a second hydrocarbon feedstock comprising aromatic compounds; and producing a first extract and a first raffinate, a fractionation train suitable for: at least partially fractionating the first extract and the hydrocarbon cut comprising compounds containing 6 or 7 carbon atoms, in a benzene-toluene fractionation device; fractionating the aromatic cut containing 8 or more carbon atoms, in a xylene column; and producing at least one cut comprising benzene, one cut comprising toluene, one cut comprising xylenes and ethylbenzene, and one cut comprising aromatics containing 9 and 10 carbon atoms, a xylenes separation unit suitable for: separating the cut comprising xylenes and ethylbenzene; and producing a second extract comprising para-xylene and a second raffinate comprising ortho-xylene, meta-xylene and ethylbenzene, and an isomerization unit suitable for isomerizing the second raffinate and producing an isomerate enriched in para-xylene which is sent to the xylene column.

According to one or more embodiments, the liquid-liquid extraction unit is suitable for sending the first raffinate to the catalytic reforming unit.

According to one or more embodiments, the device further comprises a transalkylation unit suitable for: treating the cut comprising aromatics containing 9 and 10 carbon atoms with the cut comprising toluene; and producing xylenes which are sent to the fractionation train.

According to one or more embodiments, the device further comprises a selective hydrogenolysis unit suitable for: treating the cut comprising aromatics containing 9 and 10 carbon atoms; and producing a hydrogenolysis effluent enriched in methyl-substituted aromatic compounds which is sent to the transalkylation unit.

According to one or more embodiments, the device further comprises an aromatics extraction unit, position between the feedstock separation unit and the fractionation train, and that is suitable for separating aliphatic compounds from the benzene and toluene of the hydrocarbon cut comprising compounds containing 6 or 7 carbon atoms.

According to one or more embodiments, the isomerization unit is a gas-phase and/or liquid phase isomerization unit.

According to one or more embodiments, the liquid-liquid extraction unit comprises at least a liquid-liquid extraction column, a stripper, and a distillation column.

According to a second aspect, the abovementioned objects, and also other advantages, are obtained by a process for producing and separating aromatic compounds, comprising the following steps:

treating a first feedstock comprising naphthas in the presence of a reforming catalyst, in a catalytic reforming unit, to produce at least one reforming effluent comprising hydrocarbon compounds having 6 to 10 carbon atoms;

separating the reforming effluent, in a feedstock separation unit, into at least one hydrocarbon cut comprising compounds containing 6 or 7 carbon atoms and an aromatic cut containing 8 or more carbon atoms;

extracting aromatics from a second hydrocarbon feedstock comprising aromatic compounds, in a liquid-liquid extraction unit, to produce a first extract and a first raffinate;

at least partially fractionating the first extract and the hydrocarbon cut comprising compounds containing 6 or 7 carbon atoms, in a benzene-toluene fractionation device of a fractionation train, and at least partially fractionating the aromatic cut containing 8 or more carbon atoms, in a xylene column of the fractionation train, to produce at least one cut comprising benzene, one cut comprising toluene, one cut comprising xylenes and ethylbenzene, and one cut comprising aromatics containing 9 and 10 carbon atoms;

separating the cut comprising xylenes and ethylbenzene, in a xylenes separation unit, to produce a second extract comprising para-xylene and a second raffinate comprising ortho-xylene, meta-xylene and ethylbenzene; and isomerizing the second raffinate in an isomerization unit, to produce an isomerate enriched in para-xylene which is sent to the xylene column.

According to one or more embodiments, the liquid-liquid extraction unit comprises at least one liquid-liquid extraction column used under the following operating conditions:

temperature of between 30° C. and 140° C., preferably between 40° C. and 130° C., very preferably between 50-120° C.;

absolute pressure of between 0.1 MPa and 5 MPa;

a polar solvent/feedstock weight ratio of between 2 and 15, preferably between 3 and 10, very preferably between 3 and 8;

polar solvent chosen from ethylene glycol, diethylene glycol, triethylene glycol, hexamethylphosphoramide, propylene carbonate, ethylene carbonate, sulfolane, 3-methylsulfolane, N-methylacetamide, N,N-dimethylacetamide, butyrolactone, 1-methylpyrrolidone, dimethyl sulfoxide, caprolactam, N-methylformamide, pyrrolidin-2-one, furfural, 1,1,3,3-tetramethylurea and a mixture of these.

According to one or more embodiments, the first feedstock comprising naphthas is derived from crude oil and/or natural gas condensates, and/or heavy naphthas from catalytic cracking and/or coking and/or hydrocracking.

According to one or more embodiments, the second hydrocarbon feedstock comprises at least 20% by weight of aromatic compounds having 6 to 11 carbon atoms, relative to the total weight of the feedstock.

According to one or more embodiments, the catalytic reforming unit comprises at least one reactor used under the following operating conditions:

presence of a catalyst with an active phase comprising at least one metal selected from nickel, ruthenium, rhodium, palladium, iridium or platinum, and at least one promoter selected from rhenium, tin, germanium, iridium or nickel;

temperature of between 400° C. and 600° C.;

absolute pressure of between 0.1 MPa and 3 MPa;

a mass flow rate of stream to be treated per unit mass of catalyst and per hour of between 0.1 $h^{-1}$ and 10 $h^{-1}$.

According to one or more embodiments, the process further comprises the following step:

sending the first raffinate from the liquid-liquid extraction unit to the catalytic reforming unit.

According to one or more embodiments, the process further comprises the following step:

treating the cut comprising aromatics containing 9 and 10 carbon atoms with the cut comprising toluene, in a transalkylation unit, to produce xylenes which are sent to the fractionation train.

According to one or more embodiments, the process further comprises the following step:

treating the cut comprising aromatics containing 9 and 10 carbon atoms, in a selective hydrogenolysis unit, to produce a hydrogenolysis effluent enriched in methyl-substituted aromatic compounds which is sent to the transalkylation unit.

Embodiments according to the first aspect and the second aspect, and also other characteristics and advantages of the devices and processes according to the abovementioned aspects, will become apparent on reading the description which follows, which is given solely by way of illustration and without limitation, and with reference to the following figures.

DESCRIPTION OF THE EMBODIMENTS

Figure 1:
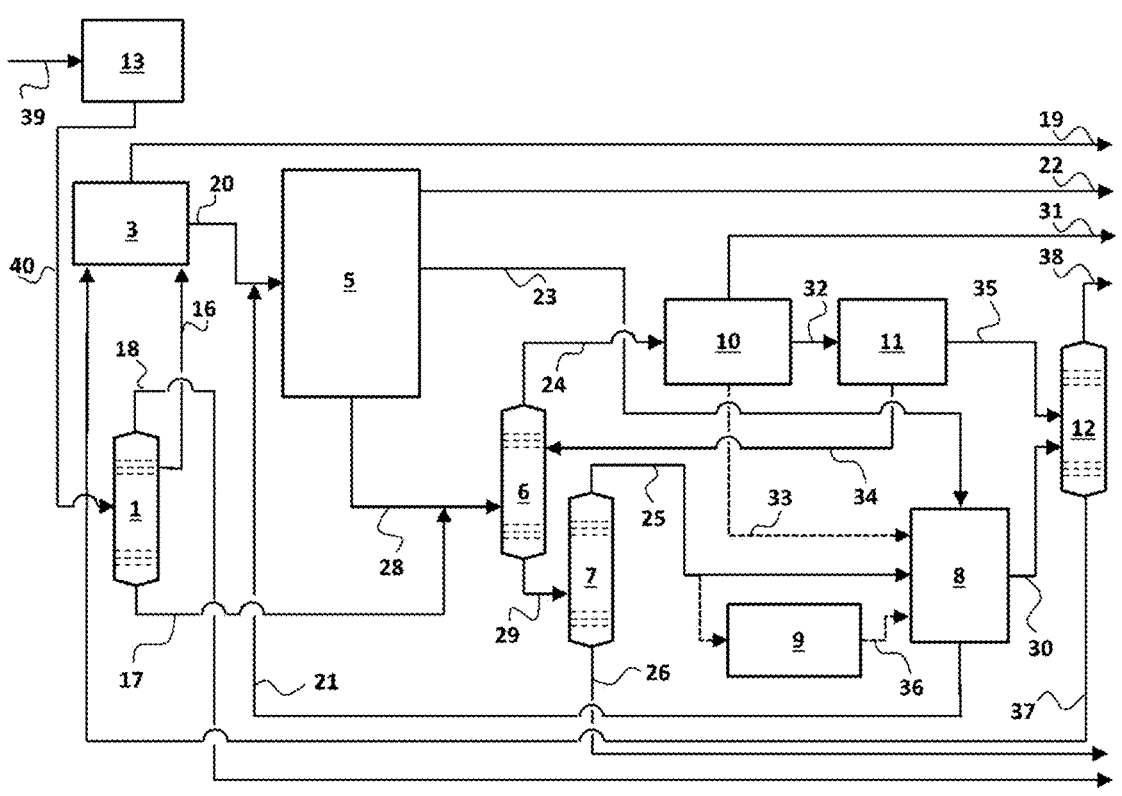
FIG. 1 shows a schematic representation of a reference device for producing and separating aromatic compounds.

Embodiments of the device according to the first aspect and of the process according to the second aspect will now be described in detail. In the following detailed description, numerous specific details are disclosed in order to provide a deeper understanding of the device. However, it will be apparent to a person skilled in the art that the device can be implemented without these specific details. In other cases, well-known characteristics have not been described in detail in order to avoid unnecessarily complicating the description.

In the present application, the term "comprise" is synonymous with (means the same thing as) "include" and "contain", and is inclusive or open and does not exclude other elements that are not stated. It is understood that the term "to comprise" includes the exclusive and closed term "to consist of". Moreover, in the present description, an effluent comprising essentially or solely compounds A corresponds to an effluent comprising at least 90% by weight, preferably at least 95% by weight, very preferably at least 99% by weight, of compounds A.

The present invention can be defined as a device and a process for producing and separating aromatic compounds comprising a sequence of unitary operations for producing para-xylene, and optionally benzene, by means of a catalytic reforming unit and a liquid-liquid extraction unit for separating aromatic compounds.

In addition, the device and process for producing and separating aromatic compounds according to the invention comprise and use catalytic units and separation units which are usually found in aromatic complexes to produce para-xylene and optionally benzene.

One of the features of the present invention consists of the injection of a stream from a liquid-liquid extraction process for the separation of aromatic compounds, in order to increase the production of aromatic compounds.

According to the first aspect, the device for producing and separating aromatic compounds comprises a unit for liquid-liquid extraction of aromatic compounds, using a polar solvent which preferentially solubilizes aromatic compounds (A6-A10) from non-aromatic compounds (naphthene, paraffins, isoparaffins) and which has a boiling point higher than that of the compounds of the feedstock, such as for example sulfolane (boiling point of 285° C.). According to one or more embodiments, the liquid-liquid extraction unit comprises a liquid-liquid extraction column, a stripper making it possible in particular to guarantee the purity of aromatic benzene by stripping light non-aromatic compounds (e.g. cyclohexane, methylcyclopentane, methylcyclohexane compounds, etc.) potentially entrained by the polar solvent, and a distillation column for separating the polar solvent from the aromatics. The liquid-liquid extraction column enables the feedstock (hydrocarbon phase) and the polar solvent (solvent phase), which are immiscible, to be brought into countercurrent contact. The hydrocarbon phase is depleted in aromatic compounds to form a raffinate while the solvent phase is enriched in aromatic compounds. The solvent phase feeds the stripper and then the distillation column, which makes it possible to recover at the top the aromatic compounds, and at the bottom the regenerated solvent which is sent back to the liquid-liquid extraction column. Thus, the liquid-liquid extraction unit is capable of producing a stream of aromatics (e.g. A6-A11$_+$, preferably A6-A11, very preferably A6-A10 compounds) referred to as the first extract and a non-aromatic stream referred to as the first raffinate.

According to the first aspect, the device for producing and separating aromatic compounds further comprises a catalytic reforming unit suitable for:

treating a feedstock comprising naphthas (e.g. heavy naphthas) in the presence of a reforming catalyst, for example containing platinum and tin, in order to convert the paraffinic compounds and naphthenes of the feedstock into aromatic compounds;

producing at least one reforming effluent (or reformate) comprising hydrocarbon compounds having 6 to 10 carbon atoms (essentially aromatic compounds);

optionally producing hydrogen-rich gases that can then be sent to other units in the refinery;

optionally separating the reforming effluent, for example to separate light C1 to C4 compounds; and sending the reforming effluent to the aromatic complex.

According to the first aspect, the production and separation device further comprises a feedstock separation unit and a fractionation train suitable for separating the reforming effluent into a plurality of cuts, and in particular the following cuts:

a cut comprising benzene;

a cut comprising toluene;

a cut comprising aromatics containing 8 carbon atoms (e.g. xylenes and ethylbenzene); an aromatic cut containing 9 and 10 carbon atoms;

optionally a heavy aromatics cut, the most volatile species of which are aromatics with 10 carbon atoms.

According to the first aspect, the device for producing and separating aromatic compounds further comprises:

a xylenes separation unit suitable for treating the cut comprising aromatics containing 8 carbon atoms and producing a second extract comprising para-xylene and a second raffinate that may comprise ortho-xylene, meta-xylene and ethylbenzene; and an isomerization unit suitable for treating the second raffinate originating from the separation of xylenes.

According to one or more embodiments, the isomerization unit is of the "isomerizing" type (i.e. isomerizing ethylbenzene to give a mixture of C8 aromatics) or "dealkylating" type (i.e. dealkylating ethylbenzene to give benzene), in order to produce, respectively, either an isomerate enriched in para-xylene, or an isomerate enriched in para-xylene and benzene. The isomerate is sent to the fractionation train.

According to one or more embodiments, the device for producing and separating aromatic compounds further comprises a transalkylation unit suitable for treating the C9-C10 monoaromatics cut with the cut comprising toluene, and optionally at least one portion of the cut comprising benzene, and producing xylenes which are sent to the fractionation train.

According to one or more embodiments, the device for producing and separating aromatic compounds further comprises a selective hydrogenolysis unit suitable for:
   treating the C9-C10 monoaromatics cut;
   producing a hydrogenolysis effluent enriched in methylsubstituted aromatic compounds which is sent to the transalkylation unit.

With reference to FIG. 1, a reference device for producing and separating aromatic compounds comprises:
   a catalytic reforming unit 13 for treating a feedstock comprising naphthas 39 (e.g. heavy naphthas) to produce at least one reforming effluent (or reformate) comprising hydrocarbon compounds having 6 to 10 carbon atoms (essentially aromatics) which are introduced into the feedstock separation unit 1;
   a feedstock separation unit 1 for separating the reforming effluent 40 comprising aromatic compounds into a hydrocarbon cut comprising compounds containing 6 or 7 carbon atoms (C6-C7) 16, an aromatic cut containing 8 or more carbon atoms (A8$_+$) 17, and optionally a top cut comprising light compounds containing 5 or fewer carbon atoms (C5−) 18;
   an aromatics extraction unit 3 (directly) downstream of the feedstock separation unit 1 for separating aliphatic compounds from the benzene and toluene of the hydrocarbon cut comprising compounds containing 6 or 7 carbon atoms (C6-C7) 16;
   a fractionation train 5-6-7 downstream of the aromatics extraction unit 3, for separating benzene, toluene, xylenes and C9-C10 monoaromatic compounds;
   a transalkylation unit 8 which converts toluene (and optionally benzene) and methylalkylbenzenes, such as trimethylbenzenes, into xylenes-advantageously, this unit can also treat tetramethylbenzenes;
   an optional selective hydrogenolysis unit 9 suitable for treating a cut comprising aromatic compounds containing 9 and 10 carbon atoms and producing a hydrogenolysis effluent enriched in methyl-substituted aromatic compounds;
   an optional separation unit (not shown) for separating the hydrogenolysis effluent positioned (e.g. directly) downstream of the selective hydrogenolysis unit 9, for producing a plurality of liquid effluent cuts;
   a xylenes separation unit 10 (e.g. of crystallization type or of simulated moving bed type using a molecular sieve and a desorbent such as toluene, para-diethylbenzene, etc.) for isolating para-xylene from xylenes and ethylbenzene;
   a unit 11 for isomerization of the second raffinate obtained as effluent from the xylene separation unit 10, in order to convert in particular the ortho-xylene, meta-xylene and ethylbenzene into para-xylene;
   an optional stabilization column 12, in particular for removing the more volatile species (e.g. C5−) from the aromatic complex, in particular the effluents from the transalkylation unit 8 and/or from the isomerization unit 11.

According to the invention, the device for producing and separating aromatic compounds comprises the elements as shown in FIG. 1 and as described above.

Figure 2:
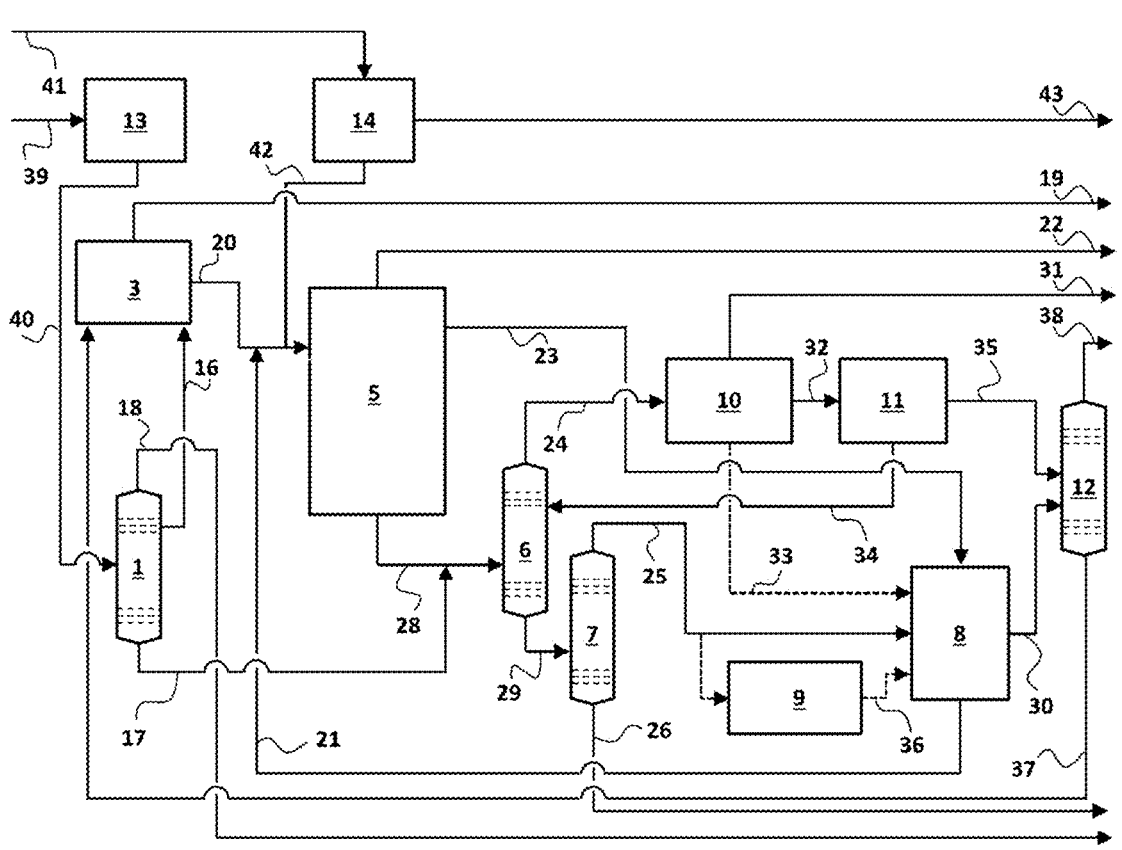
FIG. 2 shows a schematic representation of a device for producing and separating aromatic compounds according to the present invention, comprising the upgrading of an extract originating from a liquid-liquid extraction.

With reference to FIG. 2, the device for producing and separating aromatic compounds according to the present invention further comprises a unit 14 for liquid-liquid extraction of aromatic compounds which is suitable for treating a second hydrocarbon feedstock 41; producing the first extract 42 sent to a benzene-toluene fractionation device 5 of the fractionation train 5-6-7; and producing the first raffinate 43 of non-aromatic compounds which can be sent to the inlet of the catalytic reforming unit 13 (refer to FIG. 3), to a steam cracking unit or which can be exported to the gasoline pool.

With reference to FIG. 2, in the unit 13 for catalytic reforming of naphthas, a feedstock comprising naphthas 39 (naphtha feedstock) is treated to produce at least one reforming effluent 40 comprising hydrocarbon compounds containing 6 to 10 carbon atoms (e.g. essentially aromatic compounds). Advantageously, the catalytic reforming unit 13 can also produce a hydrogen-rich effluent (not shown) that can be sent to other units as a source of hydrogen.

According to one or more embodiments, the unit 13 for catalytic reforming of naphthas comprises at least one reactor used under the following operating conditions:
   presence of a catalyst with an active phase comprising at least one metal selected from nickel, ruthenium, rhodium, palladium, iridium or platinum, and at least one promoter selected from rhenium, tin, germanium, iridium or nickel, and preferably a support chosen based on alumina, silica-alumina or silica, preferably the catalyst comprises at least one of the following elements: active phase comprising platinum, promoter comprising tin, support based on alumina;
   a temperature of between 400° C. and 600° C.;
   an absolute pressure of between 0.1 MPa and 3 MPa;
   a mass flow rate of stream to be treated per unit mass of catalyst and per hour (WWH) of between 0.1 h$^{-1}$ and 10 h$^{-1}$, preferably between 0.5 h$^{-1}$ and 6 h$^{-1}$.

According to one or more embodiments, the feedstock comprising naphthas 39 is derived from crude oil and/or natural gas condensates, and/or heavy naphthas from catalytic cracking and/or coking and/or hydrocracking.

According to one or more embodiments, the value of N$_+$2A (i.e., the weight percentage of naphthenes N plus two times the weight percentage of aromatics A in the feedstock) of the feedstock comprising naphthas 39 is between 30 and 80.

According to one or more embodiments, the feedstock comprising naphthas 39 comprises at least 60% by weight, preferably at least 80% by weight, very preferably at least 95% by weight (e.g. at least 99.0% by weight), of compounds having 6 to 11 carbon atoms, relative to the total weight of the feedstock.

According to one or more embodiments, the feedstock comprising naphthas 39 comprises at least 5% by weight of naphthenes and 5% by weight of aromatics, preferably at least 10% by weight of naphthenes and 10% by weight of aromatics, very preferably at least 20% by weight of naphthenes and 20% by weight of aromatics (e.g. at least 22.5% by weight of naphthenes and 25.0% by weight of aromatics), of compounds having 5 to 11 carbon atoms, relative to the total weight of the feedstock.

With reference to FIG. 2, the feedstock separation unit 1 treats the reforming effluent 40 in order to separate:

optionally a top cut comprising (e.g. essentially) light compounds containing 5 or fewer carbon atoms 18 (C5−);

a cut of hydrocarbon compounds containing 6 or 7 or fewer carbon atoms 16 (C6-C7), optionally obtained via a side stream, and containing in particular benzene and toluene; and a bottom cut comprising (e.g. essentially) aromatics containing 8 or more carbon atoms 17 (A8$_+$).

According to one or more embodiments, the reforming effluent 40 is a hydrocarbon cut containing, preferably predominantly (i.e., >50% by weight) molecules with a carbon number extending from 6 to 10 carbon atoms. This feedstock may also contain molecules containing more than 10 carbon atoms and/or molecules containing 5 carbon atoms.

The reforming effluent 40 is rich in aromatics (e.g. >50% by weight) and preferably contains at least 20% by weight of benzene, preferentially at least 30% by weight, very preferably at least 40% by weight of benzene.

According to one or more embodiments, the reforming effluent 40 comprises less than 10 ppm by weight, preferably less than 5 ppm by weight, very preferably less than 1 ppm by weight, of elemental nitrogen, and/or less than 10 ppm by weight, preferably less than 5 ppm by weight, very preferably less than 1 ppm by weight, of elemental sulfur, and/or less than 100 ppm by weight, preferably less than 50 ppm by weight, very preferably less than 10 ppm by weight, of elemental oxygen.

The top cut 16 from the feedstock separation unit 1, optionally mixed with the bottom product (benzene and toluene) from the stabilization column 12, which will be defined below, is sent to the (optional) aromatics extraction unit 3 in order to extract an effluent 19 comprising C6-C7 aliphatic species, which is exported as co-product from the aromatic complex. The aromatic cut 20 (essentially benzene and toluene), referred to as extract from the aromatics extraction unit 3, optionally mixed with the heavy fraction 21 from the transalkylation unit 8, which will be defined below, is sent to the benzene-toluene fractionation device 5. According to one or more embodiments, the aromatic cut 20 is a C6-C7 (e.g. essentially) aromatic hydrocarbon-based feedstock (A6-A7).

According to one or more embodiments, the fractionation train comprises the benzene-toluene fractionation device 5 and distillation columns for separating the following 5 cuts:

a cut 22 comprising (e.g. essentially) benzene;

a cut 23 comprising (e.g. essentially) toluene;

a cut 24 comprising (e.g. essentially) xylenes and ethylbenzene;

a cut 25 comprising (e.g. essentially) aromatic compounds containing 9 and 10 carbon atoms;

a cut 26 comprising (e.g. essentially) aromatic compounds, the most volatile species of which are aromatics containing 10 carbon atoms.

According to one or more embodiments, the benzene-toluene fractionation device 5 comprises a sequence of a benzene column and a toluene column or a single column of the type containing a dividing wall. The benzene-toluene fractionation device 5 is suitable for treating the aromatic cut 20; and producing the cut 22 comprising benzene; the cut 23 comprising toluene; and an (e.g. essentially) aromatic C8-C10 (A8+) effluent 28.

Advantageously, the benzene-toluene fractionation device 5 can operate according to at least three operating modes:

a sequence of a benzene column followed by a toluene column;

a sequence of a toluene column followed by a benzene column, making it possible in particular to reduce the energy consumption in the benzene column since the flow to be treated in the benzene column becomes smaller;

a single column with dividing-wall technology.

With reference to FIG. 2, according to a first operating mode, the first extract 42 originating from the liquid-liquid extraction unit 14 is sent to the benzene-toluene fractionation device 5, the first raffinate 43 originating from the same unit 14 for liquid-liquid extraction of aromatics can be sent to another steam cracker type conversion unit or sent to the gasoline pool. Advantageously, the benzene-toluene fractionation device 5 is suitable for:

treating the aromatic cut 20 (optionally the heavy aromatic cut 21) and the first extract 42;

producing the cut 22 comprising benzene which may be one of the desired products at the outlet of the aromatic complex;

producing the cut 23 comprising toluene which is sent to the transalkylation unit 8; and producing the (e.g. essentially) aromatic C8-C10 (A8$_+$) effluent 28.

Figure 3:
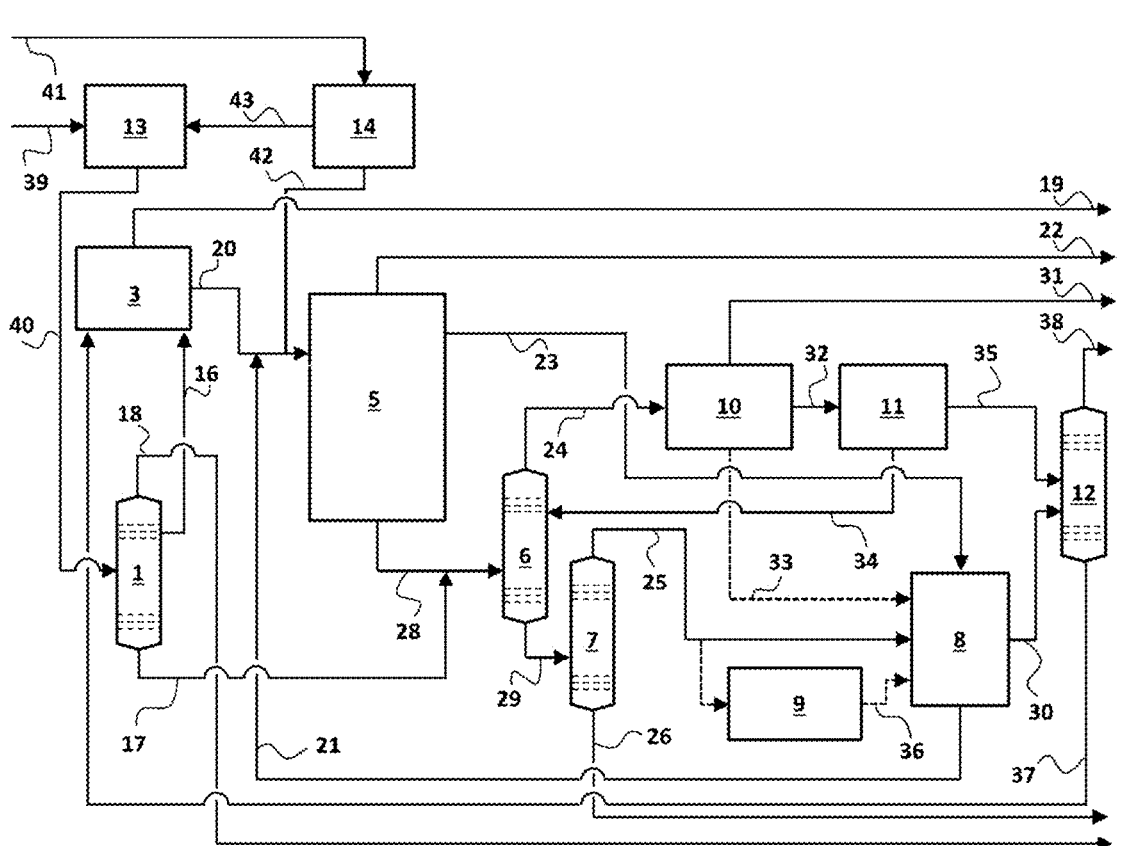
FIG. 3 shows a schematic representation of a device for producing and separating aromatic compounds according to the present invention, comprising the upgrading of an extract and a raffinate originating from the liquid-liquid extraction.

With reference to FIG. 3, according to a second operating mode, the first extract 42 originating from the liquid-liquid extraction unit 14 is sent to the benzene-toluene fractionation device 5, the first raffinate 43 originating from the same unit 14 for liquid-liquid extraction of aromatics is sent to the catalytic reforming unit 13 to produce a larger amount of aromatics.

With reference to FIG. 2 and FIG. 3, a first column 6 for distillation of aromatic compounds, also known as the xylene column, is suitable for:

treating the aromatic cut 17 containing 8 or more carbon atoms (A8+) originating from the feedstock separation unit 1;

optionally treating the C8-C10 (A8+) aromatic effluent 28 originating from the benzene-toluene fractionation device 5;

producing, at the top, the cut 24 comprising xylenes and ethylbenzene which is sent to the xylene separation unit 10; and producing, at the bottom, an (e.g. essentially) effluent 29 comprising C9-C10 (A9$_+$) aromatics.

A second column 7 for distillation of aromatic compounds, also known as the heavy aromatics column, is optional and is suitable for:

treating the bottom effluent 29 from the xylene column 6;

producing, at the top, the fraction 25 comprising C9-C10 monoaromatics; and producing, at the bottom, the cut 26 comprising (e.g. essentially) aromatic compounds, the most volatile species of which are aromatics containing 10 carbon atoms (A10$_+$). Preferably, the bottom cut 26 comprises C11$_+$ compounds.

In the transalkylation unit 8, the fraction 25 comprising C9-C10 monoaromatics (and/or the hydrogenolysis effluent enriched in methyl-substituted aromatic compounds described below) is mixed with the cut 23 comprising toluene (and optionally at least one portion of the benzene cut 22) originating from benzene-toluene fractionation device 5, and feeds the reaction section of the transalkylation unit 8 to produce xylenes by transalkylation of aromatics with a deficit of methyl groups (toluene) and aromatics with an excess of methyl groups (e.g. tri- and tetramethylbenzenes). According to one or more embodiments, the transalkylation unit 8 is fed with benzene (line not represented in FIG. 1), for example when an excess of methyl groups is observed, for the production of para-xylene. According to one or more embodiments, the transalkylation unit 8 directly treats the bottom effluent 29 from the xylene column 6.

According to one or more embodiments, the transalkylation unit 8 comprises at least one first transalkylation reactor suitable for being used under at least one of the following operating conditions:

temperature of between 200° C. and 600° C., preferentially between 350° C. and 550° C. and even more preferentially between 380° C. and 500° C.;

pressure of between 2 MPa and 10 MPa, preferentially between 2 MPa and 6 MPa and more preferentially between 2 MPa and 4 MPa;

WWH of between 0.5 $h^{-1}$ and 5 $h^{-1}$, preferentially between 2 $h^{-1}$ and 4 $h^{-1}$.

The term WWH corresponds to the weight of hydrocarbon feedstock injected hourly, relative to the weight of catalyst charged.

According to one or more embodiments, the first transalkylation reactor is operated in the presence of a catalyst comprising zeolite, for example ZSM-5. According to one or more embodiments, the second transalkylation reactor is of fixed bed type.

According to one or more embodiments, the effluents from the reaction section of the transalkylation unit 8 are separated in a first separation column (not represented) downstream of said reaction section of the transalkylation unit 8. A cut 30 comprising at least one portion of the benzene, and the more volatile species (C6−) is extracted at the top of the first separation column and is sent to an optional stabilization column 12, in particular for removing the more volatile species (e.g. C5−) from the aromatic complex. The heavy fraction 21 of the effluents from the first separation column comprising (e.g. essentially) aromatics containing at least 7 carbon atoms (A7+) is optionally recycled to the fractionation train 5-6-7, for example to the benzene-toluene fractionation device 5.

According to one or more embodiments, the selective hydrogenolysis unit 9 is suitable for:

treating the monoaromatics 25 having between 9 and 10 carbon atoms; and producing a hydrogenolysis effluent 36 enriched in methyl-substituted aromatic compounds.

Specifically, the selective hydrogenolysis unit 9 may be suitable for treating the aromatics 25 having between 9 and 10 carbon atoms by converting one or more alkyl groups having at least two carbon atoms (ethyl, propyl, butyl, isopropyl, etc. groups) attached to a benzene ring into one or more methyl groups, that is to say groups formed of a single $CH_3$ group. The major advantage of the selective hydrogenolysis unit 9 is that of increasing the content of $CH_3$ groups and lowering the content of ethyl, propyl, butyl, isopropyl, etc. groups in the feedstock of the isomerization unit 11, in order to increase the rate of production of xylenes, and in particular of para-xylene.

According to one or more embodiments, the selective hydrogenolysis unit 9 comprises at least one hydrogenolysis reactor suitable for being used under at least one of the following operating conditions:

temperature of between 300° C. and 550° C., preferentially between 350° C. and 500° C. and even more preferentially between 370° C. and 450° C.;

pressure of between 0.1 MPa and 3 MPa, preferentially between 0.2 MPa and 2 MPa and more preferentially between 0.2 MPa and 1 MPa;

$H_2$/HC (hydrocarbon feedstock) molar ratio of between 1 and 10 and preferentially of between 1.5 and 6;

WWH of between 0.1 $h^1$ and 50 $h^{-1}$ (e.g. 0.5-50 $h^{-1}$), preferentially between 0.5 $h^{-1}$ and 30 $h^{-1}$ (e.g. 1-30 $h^{-1}$), and more preferentially between 1 $h^{-1}$ and 20 $h^{-1}$ (e.g. 2-20 $h^{-1}$, 5-20 $h^{-1}$).

According to one or more embodiments, the hydrogenolysis reactor is operated in the presence of a catalyst comprising at least one metal from group VIIIB of the Periodic Table, preferably nickel and/or cobalt, deposited on a porous support comprising at least one crystalline or noncrystalline refractory oxide having structured or unstructured porosity.

According to one or more embodiments, the group VIIIB metal is nickel. The presence of a promoter (group VIB, VIIB, VIIIB, IB, IIB) is also possible. The catalyst is supported on a refractory oxide (e.g. alumina or silica), optionally treated with a base in order to neutralize it. According to one or more embodiments, the hydrogenolysis reactor is of fixed bed type and the catalyst support is in the form of extrudates. According to one or more embodiments, the hydrogenolysis reactor is of moving bed type, and the catalyst support is in the form of approximately spherical beads. A moving bed may be defined as being a gravity flow bed, such as those encountered in the catalytic reforming of gasolines.

The cut 24 comprising xylenes and ethylbenzene is treated in the xylene separation unit 10 to produce the second extract 31, comprising para-xylene, and the second raffinate 32. The second extract 31 can be subsequently distilled (e.g. if separation by SMB adsorption), for example by means of an extract column and then of an additional toluene column (which are not shown) in the case where toluene is used as desorbent, in order to obtain high-purity para-xylene exported as main product. The second raffinate 32 from the xylene separation unit 10 comprises (e.g. essentially) ortho-xylene, meta-xylene and ethylbenzene and feeds the isomerization unit 11.

According to one or more embodiments, the xylene separation unit 10 also separates a second toluene cut 33 comprising at least 90% by weight, preferably at least 95% by weight, very preferably at least 99% by weight, of toluene. The toluene cut 33 can, for example, be a portion of the toluene used as desorbent when the xylene separation unit 10 comprises a "simulated moving bed" adsorption unit. According to one or more embodiments, the second toluene cut 33 is sent to the transalkylation unit 8.

In the isomerization reaction section of the isomerization unit 11, the isomers of the para-xylene are isomerized, while the ethylbenzene can be: isomerized to give a mixture of C8 aromatics, for example if it is desired to produce mainly para-xylene; and/or dealkylated to produce benzene, for example if it is desired to produce both para-xylene and benzene. According to one or more embodiments, the effluents from the isomerization reaction section are sent to a second separation column (not represented) to produce, at the bottom, an isomerate 34 enriched in para-xylene, which is preferably recycled to the xylene column 6; and to produce, at the top, a hydrocarbon cut 35 comprising compounds containing 7 or fewer carbon atoms (C7−) which is sent to the optional stabilization column 12, for example with the cut 30 comprising at least a portion of the benzene and the more volatile species.

According to one or more embodiments, the isomerization unit 11 comprises a first isomerization zone working in the liquid phase and/or a second isomerization zone working in the gas phase, as is described in the patents listed above.

According to one or more embodiments, the gas-phase isomerization unit 11 is suitable for being operated either in "isomerizing" mode or in "dealkylating" mode, it being possible for the ethylbenzene in the second raffinate 32 to be isomerized to give xylenes or dealkylated to obtain benzene in particular. Thus, the following various configurations can be considered:

"isomerizing" type gas-phase isomerization unit alone;
    "dealkylating" type gas-phase isomerization unit alone;
    "isomerizing" type gas-phase isomerization unit and liquid-phase isomerization unit;
    "dealkylating" type gas-phase isomerization unit and liquid-phase isomerization unit;
    liquid-phase isomerization unit alone.

According to one or more embodiments, the isomerization unit 11 comprises a first isomerization zone working in the liquid phase and a second isomerization zone working in the gas phase. According to one or more embodiments, a first portion of the second raffinate 32 is sent to the liquid-phase isomerization unit, in order to obtain a first isomerate (not represented) feeding directly and at least in part the separation unit 10, and a second portion of the second raffinate 32 is sent to the gas-phase isomerization unit, in order to obtain an isomerate which is sent to the xylene column 6.

According to one or more embodiments, the gas-phase isomerization zone is suitable for being used under at least one of the following "isomerizing" operating conditions:

temperature of greater than 300° C., preferably from 350° C. to 480° C.;
    pressure of less than 4.0 MPa, and preferably from 0.5 MPa to 2.0 MPa;
    hourly space velocity of less than 15 $h^{-1}$ (10 liters per liter per hour), preferably between 0.5 $h^{-1}$ and 10 $h^{-1}$;
    hydrogen to hydrocarbon mole ratio of less than 10, and preferably of between 3 and 6;
    in the presence of a catalyst comprising at least one zeolite having channels, the aperature of which is defined by a ring containing 10 or 12 oxygen atoms (10 MR or 12 MR), and at least one group VIIIB metal in a content of between 0.1% by weight and 0.3% by weight (reduced form), limits included, relative to the total weight of the catalyst.

According to one or more embodiments, the gas-phase isomerization zone is suitable for being used under at least one of the following "dealkylating" operating conditions, for example to dealkylate the ethylbenzene catalytically and produce benzene:

temperature of between 380° C. and 460° C.;
    pressure of between 1.0 MPa and 2.5 MPa, preferably between 1.4 MPa and 2.0 MPa;
    hourly space velocity of between 10 $h^{-1}$ and 15 $h^{-1}$;
    in the presence of a catalyst comprising at least one zeolite containing an acid function and at least one hydrogenating-dehydrogenating metal, preferably a group VIIIB metal;
    hydrogen to hydrocarbon mole ratio of between 0.9 and 2.2, preferably between 1.5 and 2.0.

According to one or more embodiments, the liquid-phase isomerization zone is suitable for being used under at least one of the following operating conditions:

temperature of less than 300° C., preferably 200° C. to 260° C.;
    pressure of less than 4 MPa, preferably 2 MPa to 3 MPa;
    hourly space velocity (HSV) of less than 10 $h^{-1}$ (liters per liter per hour), preferably between 2 $h^{-1}$ and 4 $h^{-1}$;

in the presence of a catalyst including at least one zeolite having pores whose aperture is defined by a ring containing 10 or 12 oxygen atoms (10 MR or 12 MR), preferentially a catalyst including at least one zeolite having pores whose aperture is defined by a ring containing 10 oxygen atoms (10 MR), and even more preferably a catalyst including a zeolite of ZSM-5 type.

The term HSV corresponds to the volume of hydrocarbon feedstock injected hourly, relative to the volume of catalyst charged.

According to one or more embodiments, the optional stabilization column 12 produces: at the bottom, a stabilized cut 37 comprising (e.g. essentially) benzene and toluene, which is optionally recycled at the inlet of the feedstock separation unit 1 and/or of the aromatics extraction unit 3; and, at the top, a cut 38 of more volatile species (e.g. C5−), which is removed from the aromatic complex.

In the liquid-liquid extraction unit 14, the second hydrocarbon feedstock 41 comprising aromatic compounds is separated by means of the polar solvent to produce the first extract 42 and the raffinate 43. The first extract 42 comprises (essentially) aromatics containing six to eleven or more carbon atoms, denoted A6-A11. Preferably, the first extract 42 comprises (essentially) aromatics containing six to ten carbon atoms, denoted A6-A10. Advantageously, the first extract 42 is sent to the benzene-toluene fractionation device 5. With reference to FIG. 2, the raffinate 43 is sent to the gasoline pool. According to one or more embodiments, at least one portion of the raffinate 43 is sent (directly) to the catalytic reforming unit 13 (see FIG. 3) or a steam cracking unit (not shown).

According to one or more embodiments, the liquid-liquid extraction unit 14 comprises at least one liquid-liquid extraction column used under the following operating conditions:

temperature of between 30° C. and 140° C., preferably between 40° C. and 130° C., very preferably between 50-120° C.;
    absolute pressure of between 0.1 MPa and 5 MPa;
    a polar solvent/feedstock weight ratio of between 2 and 15, preferably between 3 and 10, very preferably between 3 and 8.

According to one or more embodiments, the polar solvent comprises a compound selected from ethylene glycol, diethylene glycol, triethylene glycol, hexamethylphosphoramide, propylene carbonate, ethylene carbonate, sulfolane, 3-methylsulfolane, N-methylacetamide, N,N-dimethylacetamide, butyrolactone, 1-methylpyrrolidone, dimethyl sulfoxide, caprolactam, N-methylformamide, pyrrolidin-2-one, furfural, 1,1,3,3-tetramethylurea and a mixture of these.

According to one or more embodiments, the polar solvent comprises or consists of sulfolane. According to one or more embodiments, the polar solvent consists of at least 90% by weight, preferably at least 95% by weight (e.g., of at least 99% by weight), of sulfolane, relative to the total weight of the polar solvent. According to one or more embodiments, the polar solvent further comprises an anti-solvent, such as water. According to one or more embodiments, the anti-solvent comprises or consists of water. According to one or more embodiments, the solvent comprises between 0.01% by weight and 5% by weight, preferably between 0.1% by weight and 3% by weight (e.g. between 0.5% by weight and 2% by weight), of anti-solvent, such as water, with respect to the total weight of the solvent.

According to one or more embodiments, the second hydrocarbon feedstock 41 comprises at least 20% by weight, preferably at least 30% by weight, very preferably at least 40% by weight (e.g. at least 50% by weight), of aromatic compounds having 6 to 11 carbon atoms, relative to the total weight of the feedstock.

According to one embodiment of the invention, the second hydrocarbon feedstock 41 comprises less than 50 ppm by weight of sulfur, preferably less than 10 ppm by weight of sulfur and very preferably less than 1 ppm by weight of sulfur. According to one embodiment of the invention, the second hydrocarbon feedstock 41 comprises less than 100 ppm by weight of nitrogen, preferably less than 10 ppm by weight of nitrogen, and very preferably less than 1 ppm by weight of nitrogen.

According to one embodiment of the invention, the second hydrocarbon feedstock 41 comprises less than 0.1% by weight of diolefins, preferably less than 0.05% by weight of diolefins and very preferably less than 0.01% by weight of diolefins. According to one embodiment of the invention, the second hydrocarbon feedstock 41 comprises less than 0.1% by weight of olefins, preferably less than 0.05% by weight of olefins, and very preferably less than 0.01% by weight of olefins.

According to one embodiment of the invention, the second hydrocarbon feedstock 41 is free (e.g. contains less than 10 ppm, preferably less than 1 ppm) of the following compounds: $H_2$, $H_2S$, light gas such as ethane, propane and butane. According to one embodiment of the invention, the removal of these compounds from the second hydrocarbon feedstock 41 is carried out in a fractionation column.

According to one embodiment of the invention, the second hydrocarbon feedstock 41 hass a content of less than or equal to 5000 ppm by weight, preferably of less than or equal to 4500 ppm by weight and very preferably of less than or equal to 3000 ppm by weight, of compounds comprising the compounds having a boiling point above 217° C., including naphthalene.

According to one embodiment of the invention, the second hydrocarbon feedstock 41 is derived from a gasoline cut obtained from a catalytic cracking unit and/or from the hydrogenation of a pyrolysis gasoline (PyGas).

According to one embodiment of the invention, the second hydrocarbon feedstock 41 is derived from the hydrogenation of a pyrolysis gasoline and/or a gasoline cut obtained from a catalytic cracking unit, the diolefins of which have been selectively hydrogenated, the selective hydrogenation effluent of which has been fractionated to obtain a $C6_+$ cut, and the $C6_+$ cut of which has been hydrogenated.

According to one embodiment of the invention, the second hydrocarbon feedstock 41 comprises an effluent obtained from the following successive steps: selective hydrogenation of a gasoline cut obtained from a catalytic cracking unit making it possible to hydrogenate the diolefins and to increase the weight of a portion of the light sulfur compounds, fractionation of the selective hydrogenation effluent making it possible to obtain a cut containing compounds having 5 carbon atoms and a $C6_+$ cut containing compounds having 6 or more carbon atoms, hydrogenation of said $C6_+$ cut making it possible to hydrotreat the sulfur, nitrogen and oxygen compounds, and hydrogenate the olefinic and alkenylaromatic compounds. According to one embodiment, the gasoline cut is obtained from a unit selected from the list consisting of a fluidized bed catalytic cracking (FCC—Fluid Catalytic Cracking) unit.

Advantageously, the device for producing and separating aromatic compounds according to the invention thus make it possible to upgrade an additional feedstock within the aromatic complex and the yield of (PX+BZ) product/feedstock can increase up to 7% in relative terms. In the present patent application, the groups of chemical elements are given, by default, according to the CAS classification (CRC Handbook of Chemistry and Physics, published by CRC Press, Editor-in-Chief D.R. Lide, 81st edition, 2000-2001). For example, group VIIIB according to the CAS classification corresponds to the metals from columns 8, 9 and 10 according to the new IUPAC classification; group VIB according to the CAS classification corresponds to the metals from column 6 according to the new IUPAC classification.

EXAMPLE

Reference Example

A reference example of a device for converting a feedstock produced by catalytic reforming of a naphtha is used. In the reference example, the liquid-liquid extraction unit 14 and the optional selective hydrogenolysis unit 9 are not used, and the isomerization unit 8 is of "dealkylating" type.

The composition of the feedstock comprising naphthas 39, at the inlet of the catalytic reforming unit 13, is described in table 1 below.

TABLE 1

| Line 39 | Flow rate (t/h) | Composition by weight (wt %) |
|---|---|---|
| C5-C11 paraffins | 103.4 | 51.7 |
| N5-N11 naphthenes | 44.8 | 22.4 |
| A6-A11 aromatics | 51.8 | 25.9 |
| Total | 200.0 | 100.0 |

The flow rates of the aromatic compounds of the reforming effluent 40, at the inlet of the feedstock separation unit 1, are as follows:

benzene: 6.7 t/h;

toluene: 37.4 t/h;

ethylbenzene: 8.3 t/h;

xylenes: 43.0 t/h;

A9$_+$A10 aromatics: 64.6 t/h i.e., a total of 160 t/h of aromatic compounds.

In the reference device, the set of unitary operations makes it possible to produce the following compounds:

benzene: 30.3 t/h;

para-xylene: 114.3 t/h.

Example 1 According to the Invention

Compared to the reference example, example 1 of a device according to the invention makes it possible to increase the total amount of aromatics produced, and in particular to increase the amount of para-xylene produced, by injecting a first extract 42, originating from the liquid-liquid extraction unit 14, at the inlet of the benzene-toluene fractionation device 5 (see FIG. 2). The composition of the feedstock comprising naphthas 39, at the inlet of the catalytic reforming unit 13, is described in table 1 below. In addition, in example 1, the liquid-liquid extraction unit 14 treats a cut obtained from an effluent from a catalytic cracking unit.

The composition of the second hydrocarbon feedstock 41 is described in table 2 below.

TABLE 2

| Content | Unit | Feedstock 41 |
|---|---|---|
| Paraffins | % by weight | 32.9 |
| Olefins | % by weight | 0.0 |
| Naphthenes | % by weight | 14.0 |
| Aromatics | % by weight | 53.1 |
| including C6-C7 aromatics | % by weight | 16.6 |
| including C8-C9 aromatics | % by weight | 26.2 |
| including C10 aromatics | % by weight | 8.2 |
| including C11+ aromatics | % by weight | 2.1 |

The composition of the first extract 42 is described in table 3 below.

TABLE 3

| First extract 42 | Flow rate (t/h) | Composition by weight (wt %) |
|---|---|---|
| A6 (benzene) | 7.4 | 13 |
| A7 (toluene) | 16.1 | 27 |
| A8 | 20.0 | 34 |
| para-xylene | 4.0 | 7 |
| meta-xylene | 8.5 | 14 |
| ortho-xylene | 4.4 | 8 |
| ethylbenzene | 3.1 | 5 |
| A9-A10 | 15.2 | 26 |
| Total aromatics | 58.7 | 100 |

The comparison of the results between the reference example and example 1 according to the invention is described in the table 4 below, in which the first raffinate 43 is exported to the gasoline pool (see FIG. 2).

TABLE 4

| Effluent | Reference | Example 1 | Gain |
|---|---|---|---|
| Naphtha feedstock (line 39) (t/h) | 200 | 200 | — |
| First raffinate (line 43) (t/h) | — | N/A | — |
| Aromatic complex feedstock (t/h) | — | — | — |
| Reforming effluent (line 40) | 173.8 | 173.8 | — |
| First extract (line 42) | — | 58.7 | — |
| Pure H$_2$ | 0.9 | 3.9 | — |
| Total | 174.7 | 236.4 | — |
| Aromatic complex products (t/h) | — | — | — |
| para-Xylene (line 31) | 114.3 | 153.7 | — |
| Benzene (line 22) | 30.3 | 46.0 | — |
| PX + BZ (lines 31 + 22) | 144.6 | 199.7 | — |
| Raffinate (line 19) | 8.8 | 8.8 | — |
| C5 (line 18) | 3.0 | 3.0 | — |
| Heavy fraction (line 26) | 4.7 | 5.8 | — |
| Combustible gas | 13.6 | 18.4 | — |
| Total | 174.7 | 235.7 | — |
| Products/Feedstock Yield (%) | 72 | 77 | +7% |

The products/feedstock yield, defined as the ratio between the sum of the para-xylene 31 and benzene 22 products divided by the sum of naphtha feedstock 39 and first extract 42, is increased by 7% in relative terms, which makes it possible to produce more aromatics of interest compared to the reference case.

Example 2 According to the Invention

Compared to example 1, example 2 of a device according to the invention makes it possible to increase the total amount of aromatics produced, and in particular to increase the amount of para-xylene produced, by injecting a first extract 43, originating from the liquid-liquid extraction unit

14, at the inlet of the catalytic reforming unit 13 (see FIG. 3). The composition of the feedstock comprising naphthas 39, at the inlet of the catalytic reforming unit 13, and of the first extract 42 are as described in tables 1 and 2, respectively. In addition, in example 2, the liquid-liquid extraction unit 14 treats a cut obtained from an effluent from a catalytic cracking unit.

The composition of the second hydrocarbon feedstock 41 is described in table 5 below.

TABLE 5

| Content | Unit | Feedstock 41 |
|---|---|---|
| Paraffins | % by weight | 32.9 |
| Olefins | % by weight | 0.0 |
| Naphthenes | % by weight | 14.0 |
| Aromatics | % by weight | 53.1 |
| including C6-C7 aromatics | % by weight | 16.6 |
| including C8-C9 aromatics | % by weight | 26.2 |
| including C10 aromatics | % by weight | 8.2 |
| including C11+ aromatics | % by weight | 2.1 |

The composition of the total feedstock (feedstock comprising naphthas 39 and first raffinate 43) at the inlet of the catalytic reforming unit 13 is described in table 6 below.

TABLE 6

| lines 39 and 43 | Flow rate (t/h) | Composition by weight (wt %) |
|---|---|---|
| C5-C11 paraffins | 142.0 | 54.3 |
| N5-N11 naphthenes | 58.2 | 22.2 |
| A6-A11 aromatics | 61.5 | 23.5 |
| Total | 261.2 | 100.0 |

The comparison of the results between the reference example and example 2 according to the invention is described in table 7 below, in which the first raffinate 43 is treated by the catalytic reforming unit 13 (see FIG. 3).

TABLE 7

| Effluent | Reference | Example 2 | Gain |
|---|---|---|---|
| Naphtha feedstock (line 39) (t/h) | 200 | 200 | — |
| First raffinate (line 43) (t/h) | — | 61.2 | — |
| Aromatic complex feedstock (t/h) | — | — | — |
| Reforming effluent (line 40) | 173.8 | 221.1 | — |
| First extract (line 42) | — | 58.7 | — |
| Pure H$_2$ | 0.9 | 1.3 | — |
| Total | 174.7 | 281.1 | — |
| Aromatic complex products (t/h) | — | — | — |
| para-Xylene (line 31) | 114.3 | 174.0 | — |
| Benzene (line 22) | 30.3 | 60.5 | — |
| PX + BZ (lines 31 + 22) | 144.6 | 234.5 | — |
| Raffinate (line 19) | 8.8 | 14.0 | — |
| C5 (line 18) | 3.0 | 4.9 | — |
| Heavy fraction (line 26) | 4.7 | 19.4 | — |
| Combustible gas | 13.6 | 8.3 | — |
| Total | 174.7 | 281.1 | — |
| Products/Feedstock Yield (%) | 72 | 73 | +1.4% |

The products/feedstock yield, defined as the ratio between the sum of the para-xylene 31 and benzene 22 products divided by the sum of naphtha feedstock 39, the first raffinate 43 and first extract 42, is increased by 1.4% in relative terms, which makes it possible to produce more aromatics of interest compared to the reference case.

The invention claimed is:

1. A device for producing and separating aromatic compounds comprising:

a catalytic reforming unit (13) suitable for: treating a first feedstock comprising naphthas (39) in the presence of a reforming catalyst; and producing at least one reforming effluent (40) comprising hydrocarbon compounds having 6 to 10 carbon atoms, a feedstock separation unit (1) suitable for: separating the reforming effluent (40) into at least one hydrocarbon cut comprising compounds having 6 or 7 carbon atoms (16) and an aromatic cut containing 8 or more carbon atoms (17), a liquid-liquid extraction unit (14) suitable for: extracting aromatics from a second hydrocarbon feedstock (41) comprising aromatic compounds; and producing a first extract (42) and a first raffinate (43), a fractionation train (5-6-7) suitable for: at least partially fractionating the first extract (42) and the hydrocarbon cut comprising compounds containing 6 or 7 carbon atoms (16), in a benzene-toluene fractionation device (5); fractionating the aromatic cut containing 8 or more carbon atoms (17), in a xylene column (6); and producing at least one cut comprising benzene (22), one cut comprising toluene (23), one cut comprising xylenes and ethylbenzene (24), and one cut comprising aromatics containing 9 and 10 carbon atoms, a xylenes separation unit (10) suitable for: separating the cut comprising xylenes and ethylbenzene (24); and producing a second extract (31) comprising para-xylene and a second raffinate (32) comprising ortho-xylene, meta-xylene, and ethylbenzene, and an isomerization unit (11) suitable for: isomerizing the second raffinate (32) and producing an isomerate (34) enriched in para-xylene which is sent to the xylene column (6).

2. The device as claimed in claim 1, wherein the liquid-liquid extraction unit (14) is suitable for sending the first raffinate (43) to the catalytic reforming unit (13).

3. The device as claimed in claim 1, comprising a transalkylation unit (8) suitable for: treating the cut comprising aromatics containing 9 and 10 carbon atoms with the cut comprising toluene (23); and producing xylenes which are sent to the fractionation train (5-6-7).

4. The device as claimed in claim 3, comprising a selective hydrogenolysis unit (9) suitable for: treating the cut comprising aromatics containing 9 and 10 carbon atoms; and producing a hydrogenolysis effluent (36) enriched in methyl-substituted aromatic compounds which is sent to the transalkylation unit (8).

5. The device as claimed in claim 1, comprising an aromatics extraction unit (3), positioned between the feedstock separation unit (1) and the fractionation train (5-6-7), and that is suitable for separating aliphatic compounds from the benzene and toluene of the hydrocarbon cut comprising compounds containing 6 or 7 carbon atoms (16).

6. The device as claimed in claim 1, wherein the isomerization unit (11) is a gas-phase and/or liquid-phase isomerization unit.

7. The device as claimed in claim 1, wherein the liquid-liquid extraction unit (14) comprises at least a liquid-liquid extraction column, a stripper, and a distillation column.

8. A process for producing and separating aromatic compounds, comprising:

treating a first feedstock comprising naphthas (39) in the presence of a reforming catalyst, in a catalytic reforming unit (13), to produce at least one reforming effluent (40) comprising hydrocarbon compounds having 6 to 10 carbon atoms;

separating the reforming effluent (40), in a feedstock separation unit (1), into at least one hydrocarbon cut comprising compounds containing 6 or 7 carbon atoms (16) and an aromatic cut containing 8 or more carbon atoms (17);

extracting aromatics from a second hydrocarbon feedstock (41) comprising aromatic compounds, in a liquid-liquid extraction unit (14), to produce a first extract (42) and a first raffinate (43);

at least partially fractionating the first extract (42) and the hydrocarbon cut comprising compounds containing 6 or 7 carbon atoms (16), in a benzene-toluene fractionation device (5) of a fractionation train (5-6-7), and at least partially fractionating the aromatic cut containing 8 or more carbon atoms (17), in a xylene column (6) of the fractionation train (5-6-7), to produce at least one cut comprising benzene (22), one cut comprising toluene (23), one cut comprising xylenes and ethylbenzene (24), and one cut comprising aromatics containing 9 and 10 carbon atoms;

separating the cut comprising xylenes and ethylbenzene (24), in a xylenes separation unit (10), to produce a second extract (31) comprising para-xylene and a second raffinate (32) comprising ortho-xylene, meta-xylene and ethylbenzene; and isomerizing the second raffinate (32) in an isomerization unit (11), to produce an isomerate (34) enriched in para-xylene which is sent to the xylene column (6).

9. The process as claimed in claim 8, wherein the liquid-liquid extraction unit (14) comprises at least one liquid-liquid extraction column used under the following operating conditions:

temperature of between 30° C. and 140° C.;

absolute pressure of between 0.1 MPa and 5 MPa;

a polar solvent/feedstock weight ratio of between 2 and 15;

polar solvent selected from ethylene glycol, diethylene glycol, triethylene glycol, hexamethylphosphoramide, propylene carbonate, ethylene carbonate, sulfolane, 3-methylsulfolane, N-methylacetamide, N,N-dimethylacetamide, butyrolactone, 1-methylpyrrolidone, dimethyl sulfoxide, caprolactam, N-methylformamide, pyrrolidin-2-one, furfural, 1,1,3,3-tetramethylurea, and mixtures thereof.

10. The process as claimed in claim 8, wherein the first feedstock comprising naphthas (39) is derived from crude oil and/or natural gas condensates, and/or heavy naphthas from catalytic cracking and/or coking and/or hydrocracking.

11. The process as claimed in claim 8, wherein the second hydrocarbon feedstock (41) comprises at least 20% by weight of aromatic compounds having 6 to 11 carbon atoms, relative to the total weight of the feedstock.

12. The process as claimed in claim 8, wherein the catalytic reforming unit (13) comprises at least one reactor used under the following operating conditions:

presence of a catalyst with an active phase comprising at least one metal selected from nickel, ruthenium, rhodium, palladium, iridium, or platinum, and at least one promoter selected from rhenium, tin, germanium, iridium, or nickel;

temperature of between 400° C. and 600° C.;

absolute pressure of between 0.1 MPa and 3 MPa;

a mass flow rate of stream to be treated per unit mass of catalyst and per hour of between 0.1 h-1 and 10 h-1.

13. The process as claimed in claim 8, comprising the following step:

sending the first raffinate (43) from the liquid-liquid extraction unit (14) to the catalytic reforming unit (13).

14. The process as claimed in claim 8, comprising the following step:

treating the cut comprising aromatics containing 9 and 10 carbon atoms with the cut comprising toluene (23), in a transalkylation unit (8), to produce xylenes which are sent to the fractionation train (5-6-7).

15. The process as claimed in claim 14, comprising the following step:

treating the cut comprising aromatics containing 9 and 10 carbon atoms, in a selective hydrogenolysis unit (9), to produce a hydrogenolysis effluent (36) enriched in methyl-substituted aromatic compounds which is sent to the transalkylation unit (8).

16. The process as claimed in claim 8, wherein the liquid-liquid extraction unit (14) comprises at least one liquid-liquid extraction column used under the following operating conditions:

temperature of between 40° C. and 130° C.;

absolute pressure of between 0.1 MPa and 5 MPa;

a polar solvent/feedstock weight ratio of between 2 and 15; and polar solvent selected from ethylene glycol, diethylene glycol, triethylene glycol, hexamethylphosphoramide, propylene carbonate, ethylene carbonate, sulfolane, 3-methylsulfolane, N-methylacetamide, N,N-dimethy-lacetamide, butyrolactone, 1-methylpyrrolidone, dim-ethyl sulfoxide, caprolactam, N-methylformamide, pyrrolidin-2-one, furfural, 1,1,3,3-tetramethylurea, and mixtures thereof.

17. The process as claimed in claim 8, wherein the liquid-liquid extraction unit (14) comprises at least one liquid-liquid extraction column used under the following operating conditions:

temperature of between 50-120° C.;

absolute pressure of between 0.1 MPa and 5 MPa;

a polar solvent/feedstock weight ratio of between 2 and 15; and polar solvent selected from ethylene glycol, diethylene glycol, triethylene glycol, hexamethylphosphoramide, propylene carbonate, ethylene carbonate, sulfolane, 3-methylsulfolane, N-methylacetamide, N,N-dimethy-lacetamide, butyrolactone, 1-methylpyrrolidone, dim-ethyl sulfoxide, caprolactam, N-methylformamide, pyrrolidin-2-one, furfural, 1,1,3,3-tetramethylurea, and mixtures thereof.

18. The process as claimed in claim 8, wherein the liquid-liquid extraction unit (14) comprises at least one liquid-liquid extraction column used under the following operating conditions:

temperature of between 30° C. and 140° C.;

absolute pressure of between 0.1 MPa and 5 MPa;

a polar solvent/feedstock weight ratio of between 3 and 10;

polar solvent selected from ethylene glycol, diethylene glycol, triethylene glycol, hexamethylphosphoramide, propylene carbonate, ethylene carbonate, sulfolane, 3-methylsulfolane, N-methylacetamide, N,N-dimethy-lacetamide, butyrolactone, 1-methylpyrrolidone, dim-ethyl sulfoxide, caprolactam, N-methylformamide, pyrrolidin-2-one, furfural, 1,1,3,3-tetramethylurea, and mixtures thereof.

19. The process as claimed in claim 8, wherein the liquid-liquid extraction unit (14) comprises at least one liquid-liquid extraction column used under the following operating conditions:

temperature of between 30° C. and 140° C.;

absolute pressure of between 0.1 MPa and 5 MPa;

a polar solvent/feedstock weight ratio of between 3 and 8;

polar solvent selected from ethylene glycol, diethylene glycol, triethylene glycol, hexamethylphosphoramide, propylene carbonate, ethylene carbonate, sulfolane, 3-methylsulfolane, N-methylacetamide, N,N-dimethy-lacetamide, butyrolactone, 1-methylpyrrolidone, dim-ethyl sulfoxide, caprolactam, N-methylformamide, pyrrolidin-2-one, furfural, 1,1,3,3-tetramethylurea, and mixtures thereof.

* * * * *